United States Patent [19]
Smith et al.

[11] 3,935,373
[45] Jan. 27, 1976

[54] ACCESS INSERT FOR SPLICE CASE

[75] Inventors: Bert A. Smith, Northridge; Paul C. Getz, Saugus, both of Calif.

[73] Assignee: Smith-Schreyer & Assoc., Inc., Woodland Hills, Calif.

[22] Filed: Mar. 4, 1975

[21] Appl. No.: 555,297

[52] U.S. Cl............. 174/77 R; 174/92; 277/212 C
[51] Int. Cl.².......................................... H02G 15/08
[58] Field of Search................................ 174/91–93, 174/77 R, 77 A, 74 A, 138 F; 277/212 R, 212 C, 235 R

[56] References Cited
UNITED STATES PATENTS

| 3,458,649 | 7/1969 | Channell | 174/93 |
| 3,692,926 | 9/1972 | Smith | 174/77 R X |
| 3,836,701 | 9/1974 | Worden | 174/77 R X |

Primary Examiner—Darrell L. Clay
Attorney, Agent, or Firm—Lyon & Lyon

[57] ABSTRACT

An insert for the ends of a splice case providing a sealed passageway which may be used, subsequent to installation of the splice case, for providing an access hole for receipt of additional cables and the like. The insert includes a first resilient tube having a rigid metal sleeve positioned thereabout and an end seal at a first end thereof. A second resilient tube extends from about the first resilient tube at a second end of said tube. The insert is positioned through an end member of a splice case during fabrication of the end member. The end seal may be cut at a later time when an access passageway leading into the splice case is required.

8 Claims, 5 Drawing Figures

ACCESS INSERT FOR SPLICE CASE

The present invention is directed to an improved splice case for underground electrical installations and more particularly to an access insert for such a splice case.

In recent years, telphone communication technology has reached the point where a large number of individual telephone conversations can be carried simultaneously on the same metallic pair of wires. To accomplish this, certain apparatus cases with stub cables are hooked into the main telephone cable at cable splices. These apparatus cases may be hooked to the main telephone cables as the need arises for greater telephone capacity. Thus, reentry into telephone cable splice cases has been found necessary. This results in the destruction of the various seals resulting from the dismantling of the splice case to accommodate the additional apparatus cases.

The present invention is directed to a means for providing easy access to the interior of these splice cases without requiring the dismantling of the splice case so that provision may be made for the additional stub cable. One or more inserts are positioned in the end portions of the cable splice during fabrication of these end portions. These inserts are completely sealed and need not be used immediately. Rather, at some later time, the splice case may be opened and the seal cut from the insert. In this way, stub cables may be fed through the end of the splice case and spliced to the main cable without requiring the on-the-job fabrication of an access hole for the stub cable. The insert is provided with a rigid sleeve to prevent collapse of the resilient body during prefabrication of the foamed plastic case end. Further, a larger diameter tube is provided at one end of the insert to accept the stub cable with a ring of mastic. A hose clamp then is used to compress this larger portion of the tube to force the mastic into a sealing arrangement.

Accordingly, it is an object of the present invention to provide an improved splice case for telephone equipment and the like.

It is a further object of the present invention to provide an access insert for use with telephone splice cases to facilitate the installation of apparatus cases and the like in the field.

Thus, a simple, inexpensive and easily employed splice case insert is disclosed providing easy access for the addition of apparatus cases to a splice case. Other and further objects and advantages will become apparent hereinafter.

Figure 1:
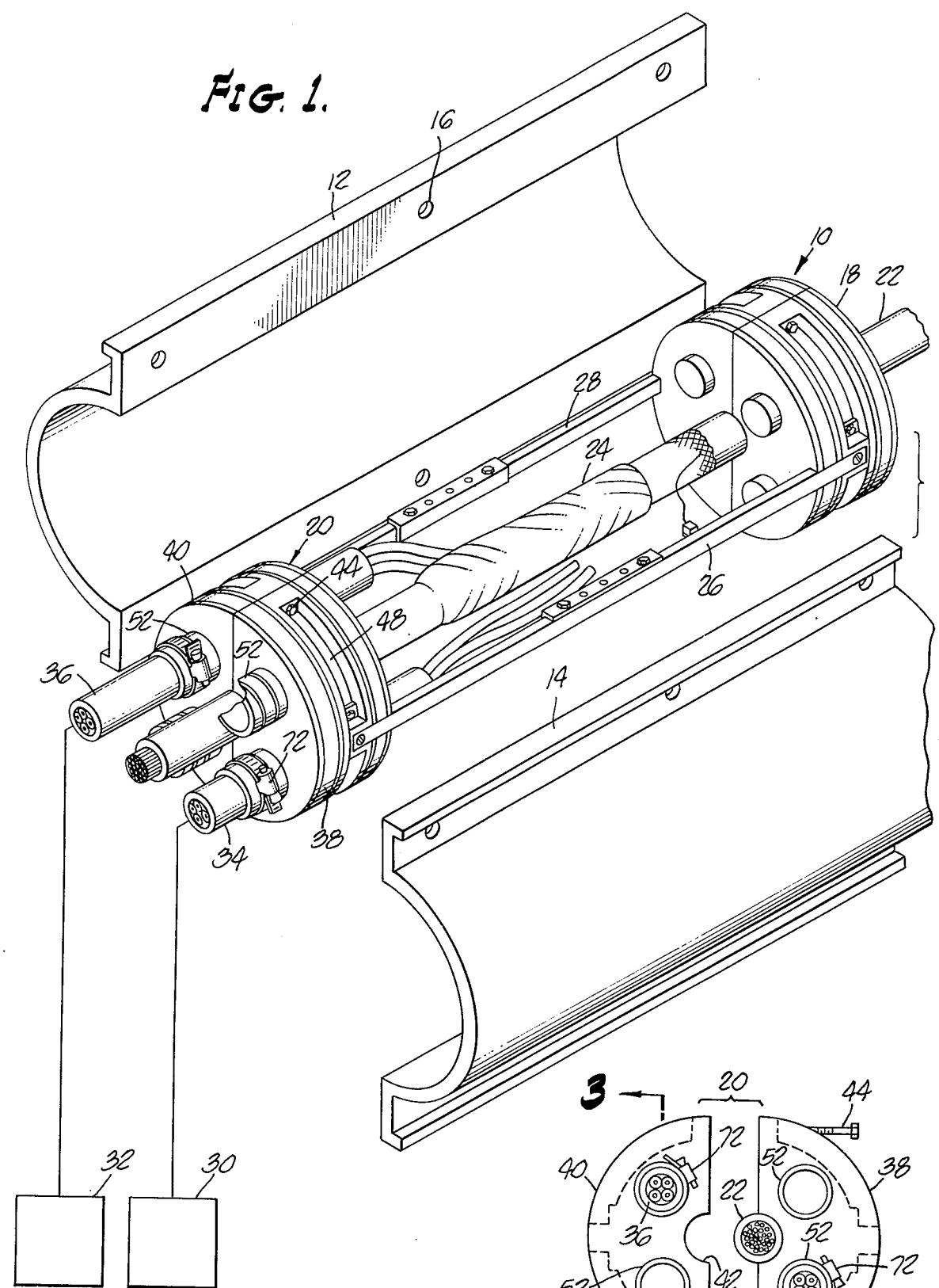
FIG. 1 is an exploded perspective view of a typical telephone splice case including the present invention.

Turning in detail to the drawings, FIG. 1 illustrates a splice case, generally designated 10, used with telephone cables. Such a splice case is disclosed in Smith, Alignable End Seals For a Splice Case, U.S. Pat. No. 3,692,926, issued Sept. 19, 1972, and assigned to the assignee of the present invention, the disclosure of which is incorporated herein by reference. The splice case 10 includes two side members 12 and 14 which are bolted together or otherwise fastened using holes 16. The splice case 10 also includes two end members 18 and 20 which are symmetrically split for acceptance of the main telephone cable 22, as can best be seen in FIG. 2. Located between the end members 18 and 20 is a splice 24 on cable 22. Rods 26 and 28 provide rigid placement of each end member 18 and 20 relative to one another. Two apparatus cases 30 and 32 are schematically illustrated as being attached to the splice 24 by stub cables 34 and 36.

Figure 2:
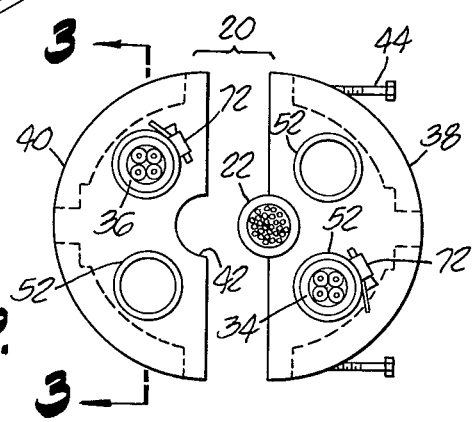
FIG. 2 is an end view of a splice case.
Figure 3:
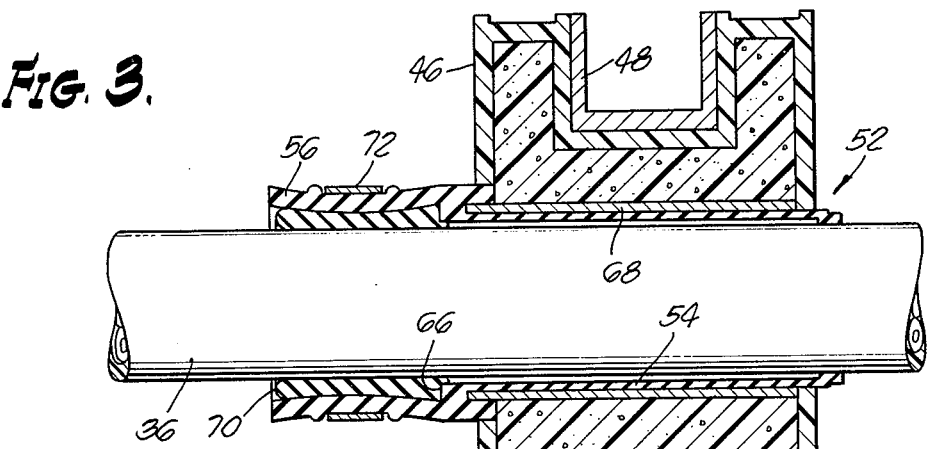
FIG. 3 is a cross-sectional view taken along line 3—3 of FIG. 2.

Looking to end member 20 as best illustrated in FIGS. 2 and 3, the end member is split into two pieces 38 and 40 each forming a semicircular portion of the cylindrical end member and having provision for the incoming main cable 22 by virtue of two semicircular notches 42. The end pieces 38 and 40 are held together by fasteners 44. Each end piece 38 and 40 includes a hard thin shell 46 defining the outer surface of each end piece except for the mating surfaces between end pieces. An arcuate metal channel 48 extends about each semicircular end piece and forms the base for the restraining fasteners 44. The shell 46 is filled with a body 50 of foamed plastic such as polyurethane. It has been found most convenient to foam the polyurethane within the shell 46. The shell 46 is sealed during the foaming operation in order that the density of the resulting foamed polyurethane will be relatively high.

Figure 4:
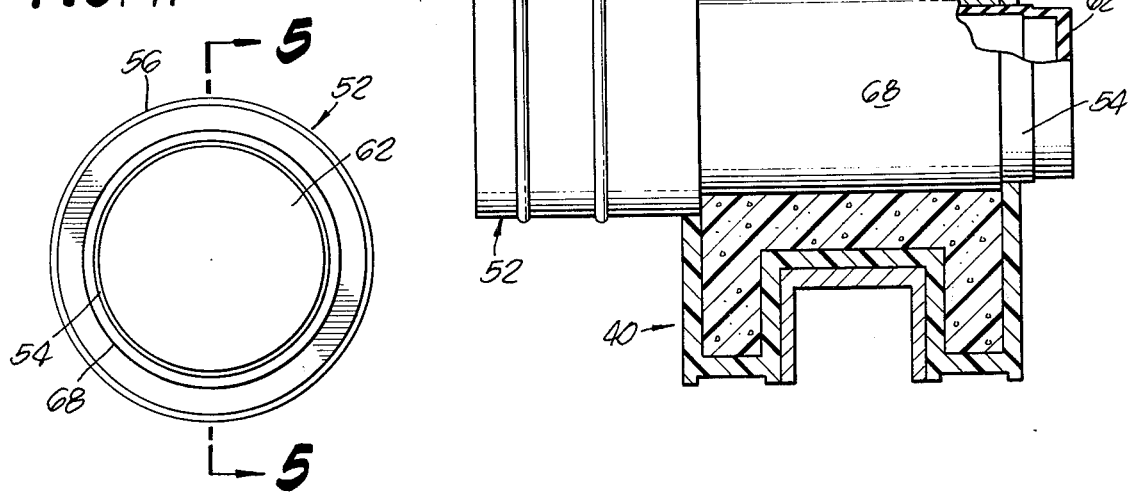
FIG. 4 is a detailed end view of an access insert of the present invention.
Figure 5:
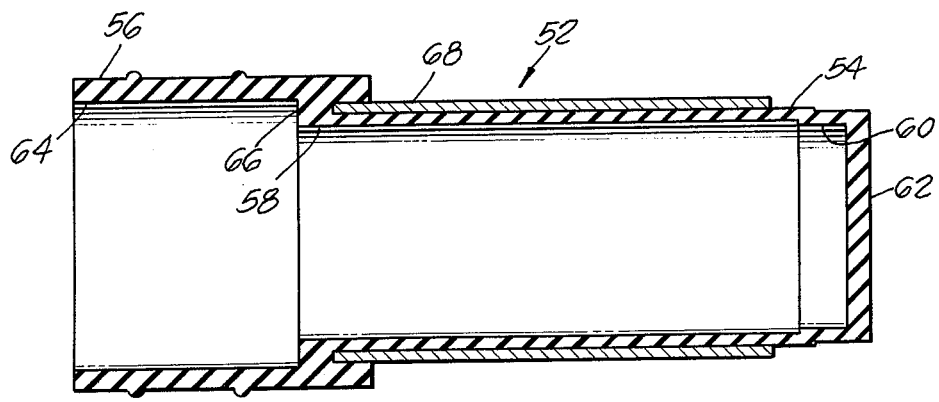
FIG. 5 is a cross-sectional side view taken along line 5—5 of FIG. 4.

Access inserts, generally designated 52, are positioned through each end piece 38 and 40 where desired. The access inserts are introduced prior to the foaming of the base 50. When the base 50 is foamed, the inserts 52 are then held in position and sealed by the base material. FIGS. 4 and 5 illustrate access inserts according to the present invention and FIG. 3 illustrates their employment in an end piece to a splice case.

Each access insert 52 includes a main body of molded neoprene and a rigid metallic sleeve. The main body of molded neoprene is divided into a first resilient tube 54 and a second resilient tube 56. The first resilient tube 54 has an inner diameter 58 slightly larger than that of a standard stub cable 36. This allows easy passage of the cable through the access insert 52. At one end of the first resilient tube 54, there is provided a minor inner diameter 60 which is roughly equal to the nominal diameter of the stub cable in order that some sealing effect may be obtained with the stub cable 36 in place. At the extreme first end of the first resilient tube 54 there is an end seal 62. The end seal consists of a membrane of the neoprene material extending across the end of the tube 54 to provide a complete seal. The first resilient tube 54 may be easily cut to remove the end seal as seen in FIG. 3. Until such time as a stub cable 36 is to be positioned through the access insert 52, this end seal 62 provides a complete barrier to moisture and other intruding elements.

The second resilient tube is of larger diameter than the first resilient tube and can be said to extend over one end of the first resilient tube 54. The inner diameter 64 of the second resilient tube 56 is larger than the inner diameter 58 in order that the stub cable 36 with a ring of mastic may be positioned therein. A shoulder 66 is provided between diameters 64 and 58.

Extending about a portion of the first resilient tube 54 is a rigid sleeve 68. The rigid sleeve is of steel having a wall thickness of 0.060 inches (.024 centimeters) in the present embodiment. The resilient sleeve does not extend to cover the entire length of the first resilient tube 54 in order that the end seals 62 may be conveniently cut therefrom. However, the resilient sleeve 68 extends from one side to the other of the end piece 40 to prevent the collapse of the access insert 52 during the pressurized foaming of the base 50.

To install the access insert 52 in the shell 46, a hole equal to the outer diameter of the first resilient tube is cut through the inner side thereof. A second hole having a centerline coincident with the centerline of the first hole is cut through the outer side of the shell 46. This second hole has a diameter equal to the outer diamter of the second resilient tube 56. Thus, when the access insert 52 is positioned in the shell 46, the rigid sleeve 68 will come to rest against the inner side of the inside wall of the shell 46. The second resilient tube will seal off the second hold through the shell 46 and the foamed base material 50 may then be added.

To assemble a stub cable 36 through the access insert 52, the end seal 62 is removed as previously discussed. A ring of mastic, commonly uncured butyl rubber is positioned about the stub cable and the stub cable 36 is then inserted through the access insert 52. The ring of mastic 70 is forced into the inner diameter 64 of the second resilient tube 56 to generally fill the space between the stub cable 36 and the inside wall of the second resilient tube 56. A conventional hose clamp 72 is then tightened about the second resilient tube 56 until it distorts the mastic 70 to fill all portions of the cavity. The hose clamp 72 also rigidly holds the stub cable 36 in place. The hose clamp 72 is positioned at a distance from the shoulder 66 as can best be seen in FIG. 3. This allows the ring of mastic 70 to flow toward the shoulder 66 when the hose clamp 72 is tightened. This longitudinal spacing between the hose clamp 72 and the shoulder 66 thereby provides a more efficient seal once the mastic has been plastically deformed.

Thus, an access insert for a splice case is provided which is simple, provides an excellent seal before use and is easily prepared for receipt of a stub cable at such time as an additional apparatus case is desired. The use of such access inserts thereby reduce the complexity and time of assembly of an additional apparatus case to an existing splice case and help assure an efficient seal of the splice case once assembled. While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. An access insert for a splice case comprising
a first resilient tube;
a rigid sleeve positioned about at least a portion of said first resilient tube;
a closed end at a first end of said first resilient tube; and
a second resilient tube, said second resilient tube extending from about a second end of said first resilient tube.

2. The insert of claim 1 further including
a shoulder depending from the inside wall of said second resilient tube formed by said second end of said first resilient tube; and
a hose clamp positioned about said second resilient tube and spaced longitudinally from said shoulder.

3. The insert of claim 1 wherein said first resilient tube extends beyond said rigid sleeve to said end, said first resilient tube being easily cut to remove said closed end.

4. The insert of claim 1 wherein said first resilient tube and said second resilient tube are one continuous piece of material.

5. The insert of claim 1 wherein the inner diameter of said first resilient tube is of sufficient dimension to slidably accommodate a standard stub cable from an apparatus case and the inner diameter of said second resilient tube is of a greater diameter than the diameter of said first resilient tube and of sufficient dimension to slidably accommodate a standard stub cable from an apparatus case with a ring of mastic positioned about the stub cable.

6. A splice case access assembly comprising
a splice case end member having a rigid shell and a foamed plastic body;
at least one access insert, said access insert including a first resilient tube positioned in said splice case end member, a first end of said first resilient tube extending from a first side of said splice end case member, an closed end at said first end of said first resilient tube, a second resilient tube, said second resilient tube extendinig from about said first resilient tube and extending from a second side of said splice case end member, a rigid sleeve positioned about a portion of said first resilient tube and extending from said first side to said second side of said splice case end member.

7. The splice case access assembly of claim 6 further including
a shoulder depending from the inside wall of said second resilient tube formed by said second end of said first resilient tube; and
a hose clamp positioned about said second resilient tube and spaced longitudinally from said shoulder.

8. The splice case access assembly of claim 6 wherein the inner diameter of said first resilient tube is of sufficient dimension to slidably accommodate a standard stub cable from an apparatus case and the inner diameter of said second resilient tube is of a greater diameter than the diameter of said first resilient tube and of sufficient dimension to slidably accommodate the standard stub cable with a ring of mastic positioned about the standard stub cable.

* * * * *